United States Patent
Simon et al.

(10) Patent No.: US 9,436,371 B2
(45) Date of Patent: Sep. 6, 2016

(54) MOBILE APPLICATION MANAGEMENT SYSTEMS AND METHODS

(71) Applicant: Verizon Patent and Licensing Inc., Arlington, VA (US)

(72) Inventors: Adam J. Simon, Keller, TX (US); Rachelle Winterrowd, Frisco, TX (US); Aaron Stahl, Dallas, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 204 days.

(21) Appl. No.: 14/472,832

(22) Filed: Aug. 29, 2014

(65) Prior Publication Data

US 2016/0062620 A1     Mar. 3, 2016

(51) Int. Cl.
| | |
|---|---|
| *G06F 3/048* | (2013.01) |
| *G06F 3/0484* | (2013.01) |
| *H04W 4/16* | (2009.01) |
| *H04M 1/725* | (2006.01) |
| *G06F 3/00* | (2006.01) |

(52) U.S. Cl.
CPC .............. *G06F 3/04847* (2013.01); *G06F 3/00* (2013.01); *G06F 3/04842* (2013.01); *H04M 1/72522* (2013.01); *H04W 4/16* (2013.01)

(58) Field of Classification Search
CPC .................................................. G06F 3/04847
USPC .......................................................... 715/767
See application file for complete search history.

(56) References Cited

U.S. PATENT DOCUMENTS

| | | | | |
|---|---|---|---|---|
| 8,990,712 B2* | 3/2015 | Reeves | ................. | G06F 3/1438 715/761 |
| 8,990,713 B2* | 3/2015 | Reeves | ................. | G06F 3/1438 715/761 |
| 2013/0080944 A1* | 3/2013 | Reeves | ................. | G06F 3/0482 715/761 |
| 2013/0104051 A1* | 4/2013 | Reeves | ................. | G06F 1/1616 715/748 |
| 2013/0219303 A1* | 8/2013 | Eriksson | ............... | G06F 3/1454 715/759 |
| 2014/0115466 A1* | 4/2014 | Barak | .................... | G06F 9/4443 715/716 |
| 2014/0195977 A1* | 7/2014 | Chang | ....................... | G06F 8/38 715/833 |

* cited by examiner

*Primary Examiner* — William Titcomb

(57) ABSTRACT

An exemplary mobile application management system detects a first user input provided by a user while a first user interface associated with a first feature of a mobile application is displayed within an application display area of a display screen of a mobile computing device executing the mobile application. The first user input represents a request to transform the first user interface into a minimized widget associated with the first feature of the mobile application. The mobile application management system directs, in response to the first user input, the mobile computing device to concurrently display, in place of the first user interface, the minimized widget within a first region of the application display area and a second user interface associated with one or more additional features of the mobile application within a second region of the application display area.

20 Claims, 10 Drawing Sheets

MOBILE APPLICATION MANAGEMENT SYSTEMS AND METHODS

BACKGROUND INFORMATION

Mobile applications (also referred to as "mobile apps") are software programs designed for use on a mobile computing device, such as a smartphone device. Typically, a user interface associated with a mobile application is displayed within a display screen of a mobile computing device while the mobile application is being executed by the mobile computing device. By interacting with the user interface, a user of the mobile application may interact with various features of the mobile application.

Because mobile computing devices often have relatively small display screens, a user may be forced to switch between multiple user interfaces in order to interact with multiple features of a mobile application. For example, a user may utilize a conference call mobile application executed by a smartphone device to participate in a conference call by way of the smartphone device. During the conference call, a first user interface that allows the user to interact with control features associated with the conference call (e.g., features that allow the user to end the conference call, mute the smartphone's microphone, upload content to the conference call, etc.) may be displayed on the display screen of the smartphone device. However, while the user is still on the conference call, he or she may desire to access a "calendar" feature provided by the conference call mobile application in order to determine when his or her next conference call is scheduled to occur. To do so, the user may direct the conference call mobile application to switch from displaying the first user interface to displaying a second user interface associated with the "calendar" feature. Unfortunately, while the second user interface is displayed, the user cannot access the control features that are only provided in the first user interface.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
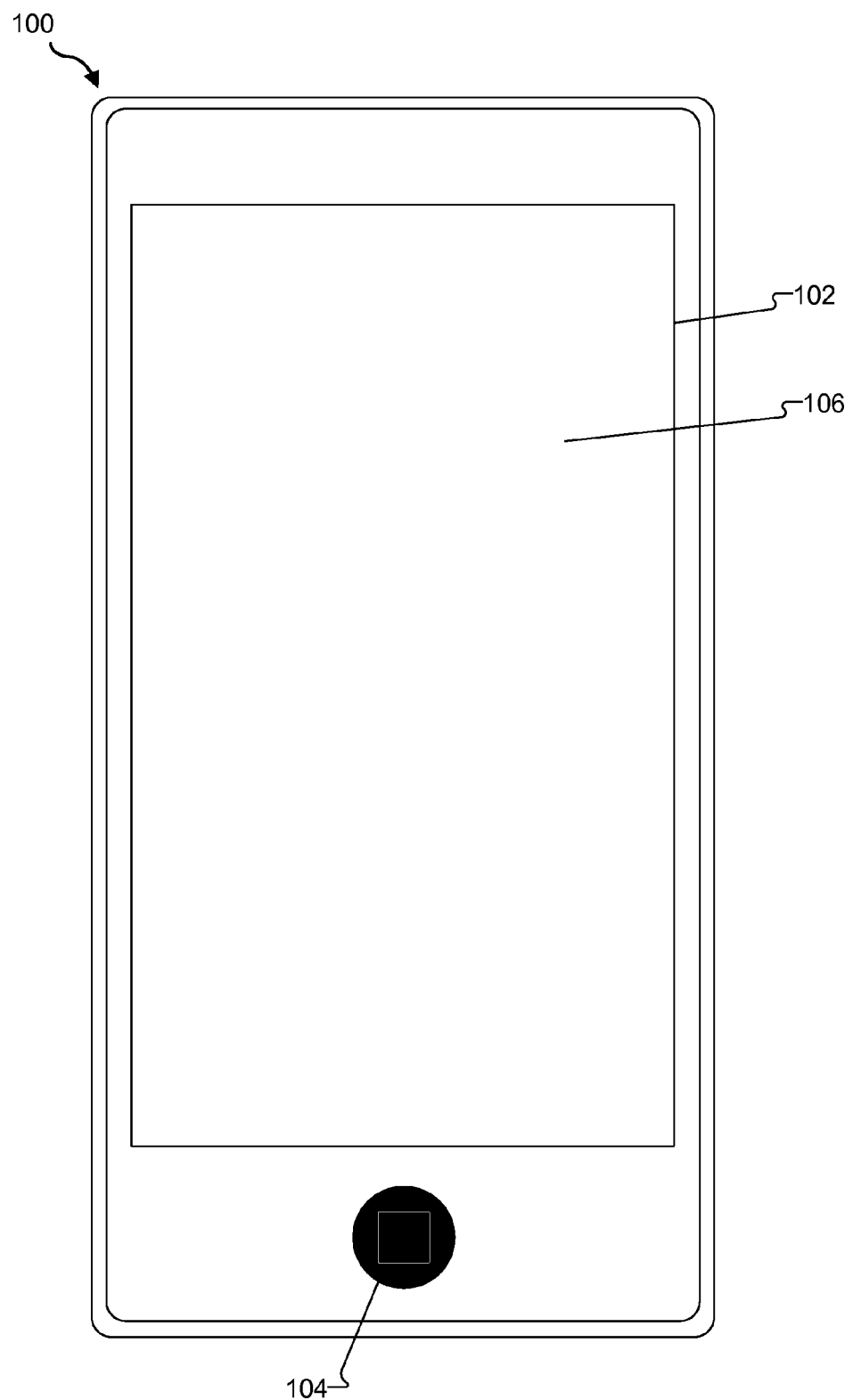
FIG. 1 illustrates an exemplary mobile computing device that may be used to access a mobile application according to principles described herein.

Exemplary mobile application management systems and methods are described herein. As will be described in more detail below, an exemplary mobile application management system may detect a first user input provided by a user while a first user interface associated with a first feature of a mobile application is displayed within an application display area of a display screen of a mobile computing device executing the mobile application. The first user input represents a request to transform the first user interface into a minimized widget associated with the first feature of the mobile application. The mobile application management system may direct, in response to the first user input, the mobile computing device to concurrently display, in place of the first user interface, the minimized widget within a first region of the application display area and a second user interface associated with one or more additional features of the mobile application within a second region of the application display area. As will be explained below, the second user interface facilitates interaction by the user with the one or more additional features of the mobile application within the second region of the application display area while the minimized widget is displayed within the first region of the application display area. Likewise, the minimized widget facilitates control by the user of the first feature of the mobile application while the second user interface is displayed within the second region of the application display area.

The systems and methods described herein may provide a user with an intuitive and/or convenient way to interact with (e.g., control) multiple features of a mobile application without having to switch between multiple user interfaces each associated with a different feature of the mobile application and that each occupies an entire application display area of a display screen. For example, a user accessing a conference call feature of a conference call mobile application by way of a first user interface displayed on a display screen of a mobile computing device may desire to access a user schedule feature of the conference call mobile application. To do so, the user may provide input to transform the first user interface into a minimized widget. In response, the systems and methods described herein may direct the mobile computing device to concurrently display, in place of the first user interface, the minimized widget and a second user interface that facilitates user interaction with the user schedule feature of the conference call mobile application. While the minimized widget and the second user interface are displayed concurrently on the display screen, the user may still control the conference call feature of the conference call mobile application by interacting with the minimized widget.

The systems and methods described herein may also allow a user to concurrently interact with multiple mobile applications without having to switch between multiple user interfaces associated with the mobile applications and that each occupies an entire application display area of a display screen. For example, a user interacting with a conference call feature of a conference call mobile application by way of a first user interface displayed on a display screen of a mobile computing device may desire to access a search feature of an Internet browser mobile application. To do so, the user may provide input to transform the first user interface associated with the conference call feature of the conference call mobile application into a minimized widget. In response, the systems and methods described herein may direct the mobile computing device to concurrently display, in place of the first user interface, the minimized widget and a second user interface associated with the search feature of the Internet browser application. While the minimized widget and the second user interface are displayed concurrently on the display screen, the user may still control the conference call feature of the conference call mobile application by interacting with the minimized widget.

Exemplary mobile application management systems and methods will now be described in reference to the drawings.

FIG. 1 shows an exemplary mobile computing device 100 that may be configured to execute one or more mobile applications. In the example shown in FIG. 1, mobile computing device 100 is in the form of a smartphone device. However, it will be recognized that mobile computing device 100 may alternatively be implemented by a tablet computing device and/or any other handheld personal electronic device.

As shown, mobile computing device 100 may include a display screen 102 and a physical input button 104. In some examples, user interfaces associated with mobile applications executed by mobile computing device 100 may be displayed within an application display area 106 located within display screen 102. In some examples, as shown in FIG. 1, application display area 106 may occupy the entire display screen 102. Alternatively, application display area 106 may only occupy a portion of display screen 102.

As mentioned, one or more user interfaces may be displayed within the application display area 106 of display screen 102. The one or more user interfaces may facilitate interaction by a user with one or more features of one or more mobile applications being executed by mobile computing device 100. As used herein, a "feature" of a mobile application may refer to a user-selectable option provided by the mobile application, graphical content (e.g., video-based content, images, and/or text) presented by the mobile application, audio content presented by the mobile application, and/or any other mobile application content that the user may select, experience (e.g., view and/or listen to), or otherwise interact with by way of a user interface. Exemplary mobile application features will be described in more detail below.

In some examples, a user may interact with mobile computing device 100 (e.g., with one or more mobile applications being executed by mobile computing device 100) by providing user input with respect to mobile computing device 100. The user input may be representative of one or more commands, requests, and/or actions with respect to a mobile application residing on or otherwise executable by the mobile computing device. For example, the user input may be representative of a request to initiate execution of a mobile application by the mobile computing device, close a mobile application being executed by the mobile computing device, select an option provided by a mobile application, and/or otherwise interact with a mobile application being executed by mobile computing device 100.

A user may provide user input with respect to mobile computing device 100 in any suitable manner. For example, the user may provide user input by selecting a physical input button (e.g., physical input button 104) of mobile computing device 100, performing a touch gesture with respect to display screen 102, and/or in any other manner as may serve a particular implementation.

In some examples, mobile computing device 100 may be configured with and/or be in communication with a mobile application management system that facilitates interaction by a user with one or more mobile applications executed by mobile computing device 100.

Figure 2:
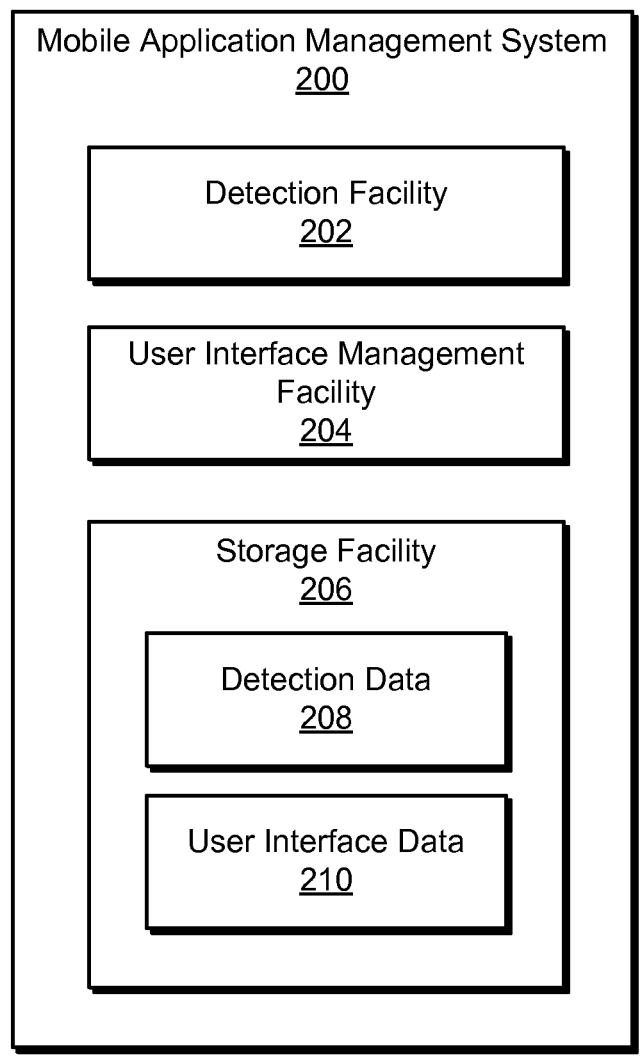
FIG. 2 illustrates an exemplary mobile application management system according to principles described herein.

For example, FIG. 2 illustrates an exemplary mobile application management system 200 ("system 200") that may be configured to facilitate interaction by a user with one or more mobile applications executed by a mobile computing device (e.g., mobile computing device 100). As shown, system 200 may include, without limitation, a detection facility 202, a user interface management facility 204 ("management facility 204"), and a storage facility 206 selectively and communicatively coupled to one another. Any suitable communication technologies, including any of the communication technologies mentioned herein, may be employed to facilitate communications between facilities 202-206.

Although facilities 202-206 are shown to be discrete facilities in FIG. 2, facilities 202-206 may be combined into fewer facilities, such as into a single facility, or divided into more facilities as may serve a particular implementation. Additionally or alternatively, one or more of the facilities 202-206 may be omitted from and external to system 200 in other implementations. For example, storage facility 206 may be external of and communicatively coupled to system 200 in certain alternative implementations. Facilities 202-206 will now be described in more detail.

Storage facility 206 may store detection data 208 and user interface data 210. Detection data 208 may include data generated and/or used by detection facility 202 in any of the ways described herein. For example, detection data 208 may represent user input, provided by a user by way of a mobile computing device, to interact with one or more features of a mobile application being executed by the mobile computing device. User interface data 210 may include any data used and/or generated by management facility 204. For example, user interface data 210 may include data used to provide a user interface, such as any of the exemplary user interfaces described herein. Storage facility 206 may maintain additional or alternative data as may serve a particular implementation.

Detection facility 202 may detect user input provided by a user by way of a mobile computing device. The user input may include any type of user input as described in connection with FIG. 1, and may be representative of any command, request, and/or action with respect to a mobile application residing on or otherwise executable by the mobile computing device.

For example, while a first user interface associated with a first feature of a mobile application is displayed within an application display area (e.g., application display area 106) of a display screen (e.g., display screen 102) of a mobile computing device (e.g., mobile computing device 100) executing the mobile application, detection facility 202 may detect user input representative of a request to transform (e.g., graphically transform) the first user interface into a minimized widget associated with the first feature. The user input may include a touch gesture (e.g., a downward swipe touch gesture), a selection of a button (e.g., physical input button 104), and/or any other type of user input as may serve a particular implementation.

Management facility 204 may perform one or more management operations with respect to one or more user interfaces associated with one or more mobile applications executed by the mobile computing device. For example, in response to detection facility 202 detecting the first user input representative of the request to transform the user interface into the minimized widget associated with the feature of the mobile application, management facility 204 may direct the mobile computing device to concurrently display, in place of the first user interface, the minimized widget within a first region of the application display area and a second user interface associated with one or more additional features of the mobile application within a second region of the application display area. The second user interface facilitates interaction by the user with the one or more additional features of the mobile application within the second region of the application display area while the minimized widget is displayed within the first region of the application display area. Likewise, the minimized widget facilitates control by the user of the first feature of the mobile application while the second user interface is displayed within the second region of the application display area.

Figure 3:
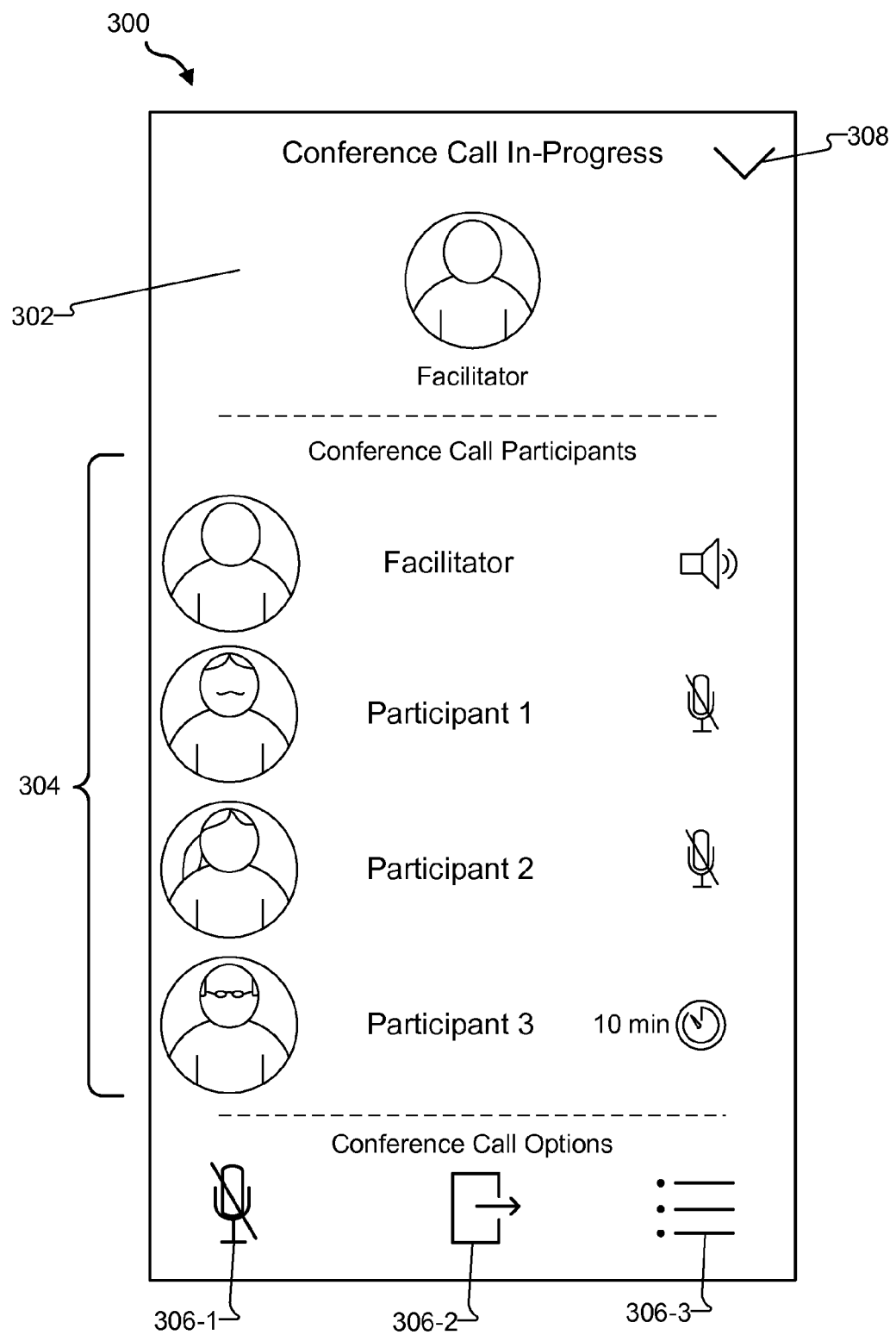
FIGS. 3-7 illustrate various user interfaces and minimized widgets that may be displayed within an exemplary application display area of a display screen of a mobile computing device according to principles described herein.

To illustrate, FIG. 3 shows an exemplary application display area 300 of a display screen of a mobile computing device (e.g., mobile computing device 100) executing a mobile application and that includes a user interface 302 displayed therein. User interface 302 may be provided by the mobile application for display within the application display area 300, and, as shown in FIG. 3, may entirely occupy the application display area 300. In some alternative examples, user interface 302 may occupy less than the entire application display area 300.

In the example of FIG. 3, user interface 302 is associated with (i.e., facilitates user interaction with) a conference call feature of a conference call mobile application being executed by the mobile computing device. A user may utilize the conference call feature provided within user interface 302 to participate in a conference call between the user and one or more other participants. For example, the conference call feature as provided within user interface 302 provides information and options associated with an active conference call in-progress between several participants 304 (e.g., a facilitator and three other participants).

A user (e.g., the facilitator and/or any of the participants) of the mobile computing device may interact with the conference call feature associated with user interface 302 in any suitable manner. For example, the user may provide input to select one or more user-selectable options (e.g., conference call options 306-1 through 306-3) displayed within user interface 302 in order to interact with and/or control the conference call being made by way of the conference call mobile application. As an example, the user may select option 306-1 during the conference call to mute a microphone of the user's mobile computing device, option 306-2 to transfer the conference call, and/or option 306-3 to access notes associated with the conference call. It will be recognized that conference call options 306-1 through 306-3 are illustrative only and that any other user-selectable options may be displayed within user interface 302 as may serve a particular implementation.

While user interface 302 is displayed within application display area 300, the user may desire to access one or more features of the conference call mobile application that are not associated with user interface 302 (i.e., that are not accessible by way of user interface 302). To this end, the user may provide user input representative of a request to minimize user interface 302 (i.e., graphically transform user interface 302 into a minimized widget associated with the conference call feature). The user input may be provided in any suitable manner.

For example, the user may provide the request to transform user interface 302 into a minimized widget by selecting (e.g., touching) a minimization option 308 displayed within user interface 302. Additionally or alternatively, the user may provide the request to transform user interface 302 into a minimized widget by performing a touch gesture (e.g., a tap or a downward swipe) within the application display area 300, selecting a physical input button (e.g., physical input button 104), and/or in any other manner.

In response to detection facility 202 detecting user input representative of a request to transform user interface 302 into a minimized widget associated with the conference call feature, management facility 204 may direct the mobile computing device to concurrently display, in place of user interface 302, the minimized widget within a first region of application display area 300 and a second user interface associated with one or more additional features of the conference call mobile application within a second region of application display area 300.

Figure 4:
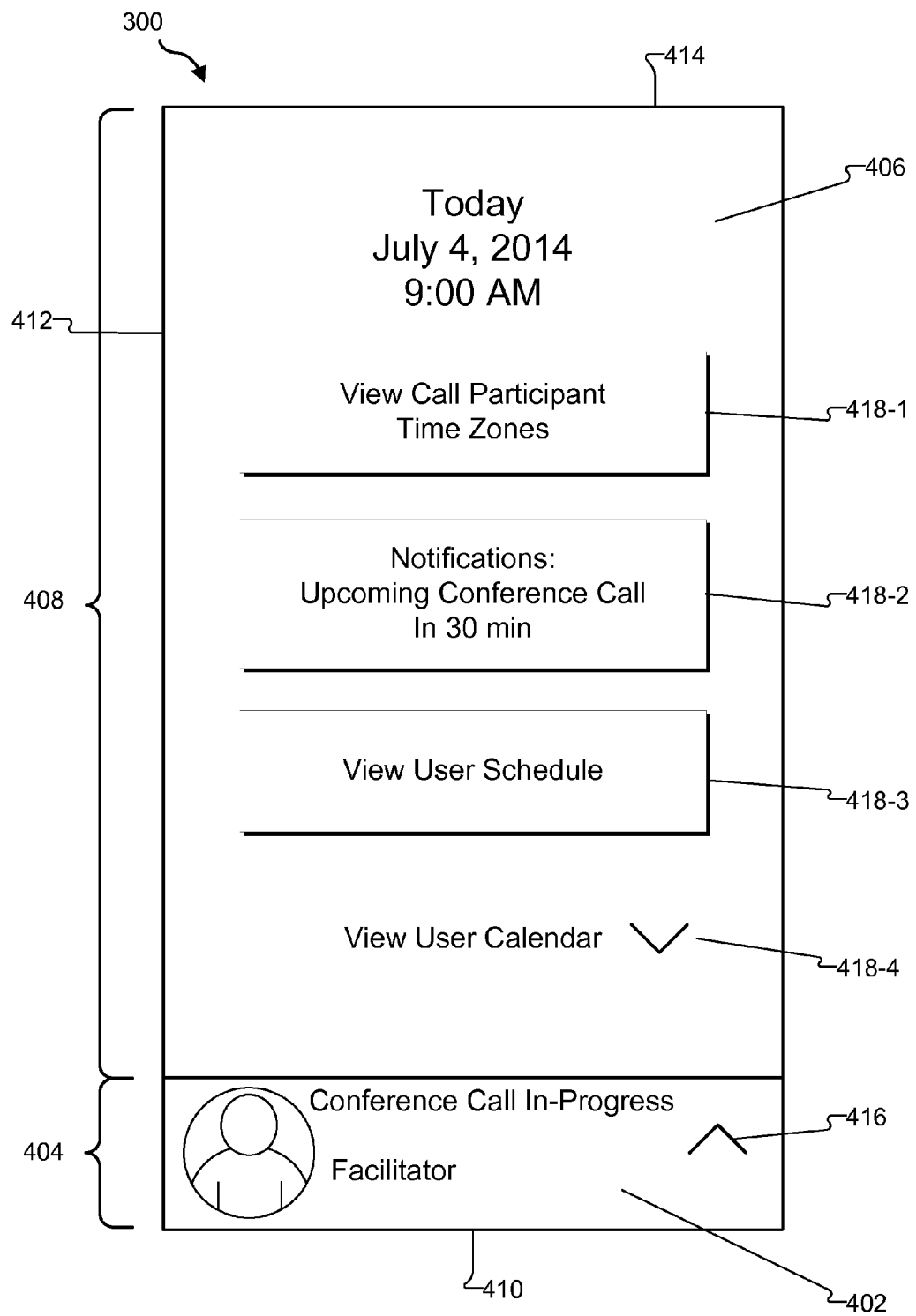

To illustrate, FIG. 4 shows application display area 300 after management facility 204 has directed the mobile computing device to transform user interface 302 into a minimized widget. As shown, user interface 302 has been replaced with a minimized widget 402 displayed within a first region 404 of application display area 300 and a second user interface 406 displayed within a second region 408 of application display area 300. The first region 404 and the second region 408 of application display area 300 may be of any suitable size and may be positioned in any suitable position within application display area 300 as may serve a particular implementation. In some examples, as is shown in FIG. 4, the first region 404 of the application display area 300 may be positioned such that the minimized widget 402 occupies a space along an edge (e.g., along a bottom edge 410) of the application display area 300, and the second region 408 may occupy a remaining space of the application display area 300 not occupied by the first region 404. In other examples, the minimized widget 402 may alternatively be positioned along a different edge (e.g., a side edge 412 or a top edge 414) of the application display area 300 and/or at any other location within the application display area 300 as may serve a particular implementation.

As shown in FIG. 4, minimized widget 402 may display information and/or user-selectable options associated with the conference call feature (i.e., the first feature) of the conference call mobile application. For example, minimized widget 402 may include a display of the title of the conference call (e.g., "conference call in-progress"), information regarding one or more of the conference call participants, information regarding a duration of the conference call, and/or any other information as may serve a particular implementation. In some examples, as shown in FIG. 4, minimized widget 402 may include a display of a user-selectable "maximize widget" option 416 that may be selected by a user in order to direct the mobile computing device to transform the minimized widget 402 back into the user interface 302 shown in FIG. 3.

User interface 406 may display information (e.g., a current date, a current time of day, etc.) and/or one or more user-selectable options 418 (e.g., option 418-1 through option 418-4) associated with one or more additional features (i.e., one or more features in addition to the conference call feature) associated with the conference call mobile application. Options 418, when selected by a user (e.g., by way of user input such as a touch gesture provided within the second region 408 of the application display area 300), may facilitate interaction by the user with the one or more additional features of the conference call mobile application.

While the minimized widget 402 and user interface 406 are both displayed within the application display area 300 (i.e., within the first region 404 and the second region 408, respectively), a user may desire to interact with (e.g., control) the conference call feature of the conference call mobile application. To do so, the user may provide user input by way of the minimized widget 402. For example, the user may provide a touch gesture (e.g., a swipe-to-the-left, a swipe-to-the-right, an upward swipe, a downward swipe, a single tap, a double tap, a closed pinch, a reverse pinch, and/or any other suitable touch gesture) within the first region 404 of the application display area 300. The touch gesture may be representative of a command (e.g., a command to mute the microphone of the user's mobile computing device, transfer the conference call, end the conference call, etc.) associated with the conference call feature. In response to the user input, management facility 204 may direct the mobile computing device to execute the command associated with the conference call feature.

To illustrate, while the minimized widget 402 and the user interface 406 are both displayed within the application display area 300, the user may provide, within the first region 404 of the application display area 300, a touch gesture (e.g., a double tap) representative of a command to mute the microphone of the user's mobile computing device. In response, management facility 204 may mute the microphone of the user's mobile computing device while maintaining a display of both the minimized widget 402 and the user interface 406 within the application display area 300. As another example, the user may provide a swipe-to-the-right touch gesture within the first region 404 of the application display area and, in response, management facility 204 may initiate a transfer of the conference call from the user's mobile computing device to another device (e.g., to another mobile computing device, a landline telephone device, etc.) capable of managing the conference call, while maintaining a display of both the minimized widget 402 and the user interface 406 within the application display area 300.

In addition to, or instead of, interacting with the conference call feature of the conference call mobile application by way of the minimized widget 402, the user may desire to interact with an additional feature of the conference call mobile application included in the one or more additional features provided within user interface 406. To do so, the user may provide user input to select one of user-selectable options 418.

For example, the user may select (e.g., touch) option 418-4 in order to provide a command for the conference call mobile application to display a calendar associated with the user. In response, management facility 204 may direct the mobile computing device to execute the command by displaying the user's calendar within user interface 406 (e.g., by shifting the display of user interface 406 to include a display of the user's calendar, by displaying a pop-up window including the user's calendar within user interface 406, and/or in any other manner) while the minimized widget 402 remains displayed within the first region 404 of the application display area.

As another example, the user may select (e.g., touch) option 418-3. In response, management facility 204 may direct the mobile computing device to replace the user interface 406 displayed within the second region 408 of the application display area 300 with another user interface associated with a "user schedule" feature of the conference call mobile application, while maintaining the display of the minimized widget 402 within the first region 404 of the application display area 300.

Figure 5:
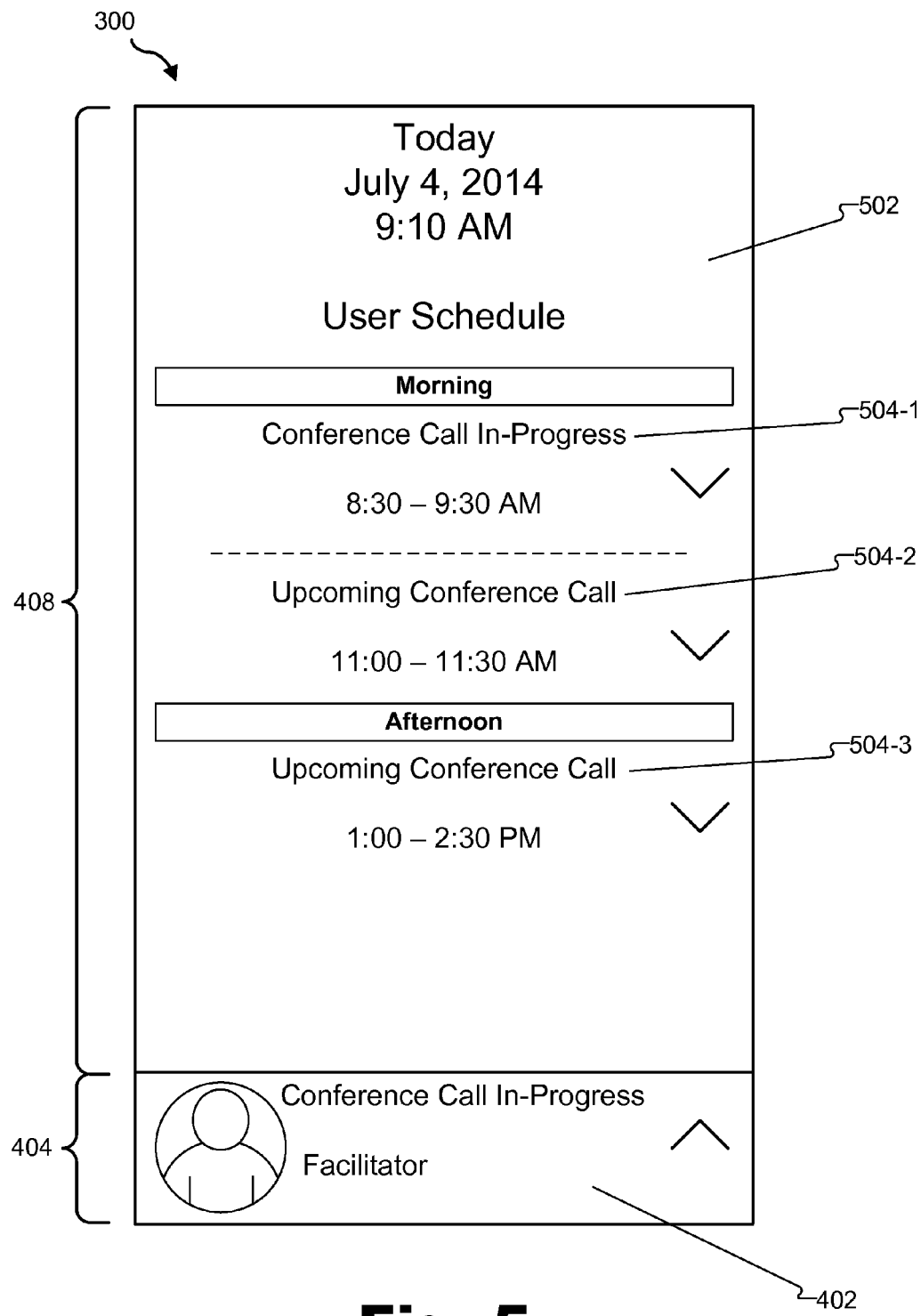

To illustrate, FIG. 5 shows application display area 300 after management facility 204 has directed the mobile computing device to replace the user interface 406 with another user interface associated with an additional feature (e.g., a user schedule feature) of the conference call mobile application. As shown, user interface 406 has been replaced within second region 408 by a user interface 502 associated with the user schedule feature of the conference call mobile application while the minimized widget 402 remains displayed within first region 404 of the application display area 300.

While the minimized widget 402 and user interface 502 are both displayed within the application display area 300 (i.e., within the first region 404 and the second region 408, respectively), the minimized widget 402 may continue to facilitate interaction with the conference call feature of the conference call mobile application as described above in connection with FIG. 4. Likewise, the user interface 502 may facilitate interaction with the user schedule feature of the conference call mobile application while minimized widget 402 and user interface 502 are concurrently displayed within the application display area 300.

For example, the user may provide input within the second region 408 of the application display area 300 to select an option 504 (e.g., one of options 504-1 through option 504-3) in order to view information and/or user-selectable options associated with a scheduled conference call included in the user's schedule of conference calls. In one example, a user may select (e.g., touch) option 504-1 in order to view scheduling information regarding a conference call in-progress. The user may additionally or alternatively select option 504-2 in order to view scheduling information associated with an upcoming conference call scheduled for 11:00-11:30 am and/or option 504-3 in order to view scheduling information associated with an upcoming conference call scheduled for 1:00-2:30 pm. The scheduling information associated with all of options 504 may be viewed or otherwise accessed while minimized widget 402 remains displayed within application display area 300.

In some examples, while a minimized widget (e.g., minimized widget 402) and another user interface (e.g., user interface 406 or user interface 502) associated with the first mobile application are concurrently displayed within the application display area 300, the user may desire to access a second mobile application (e.g., a mobile application other than the conference call mobile application) while maintaining access to the minimized widget associated with the first mobile application. To this end, the user may provide user input representative of a command for the mobile computing device to execute the second mobile application. The user input may be provided in any suitable manner and may be detected by detection facility 202 in any of the ways described herein.

In response to detection facility 202 detecting the user input representative of the command to execute the second mobile application, management facility 204 may direct the mobile computing device to replace the user interface (e.g., user interface 406 or user interface 502) displayed within the second region 408 of application display area 300 with a user interface associated with the second mobile application. The user interface associated with the second mobile application may facilitate interaction by the user with one or more features of the second mobile application while the minimized widget associated with the first mobile application remains displayed within the application display area 300.

To illustrate, minimized widget 402 and user interface 406 associated with the conference call mobile application described above may be concurrently displayed within first and second regions 404 and 408, respectively, of application display area 300 as shown in FIG. 4. In this scenario, the user may provide user input representative of a command for the mobile computing device to execute an Internet browser mobile application concurrently with the conference call mobile application. In response, management facility 204 may direct the mobile computing device to display a user interface associated with the Internet browsing mobile application within second region 408 of application display area 300 in place of user interface 406 while minimized widget 402 remains displayed within first region 404 of application display area 300.

Figure 6:
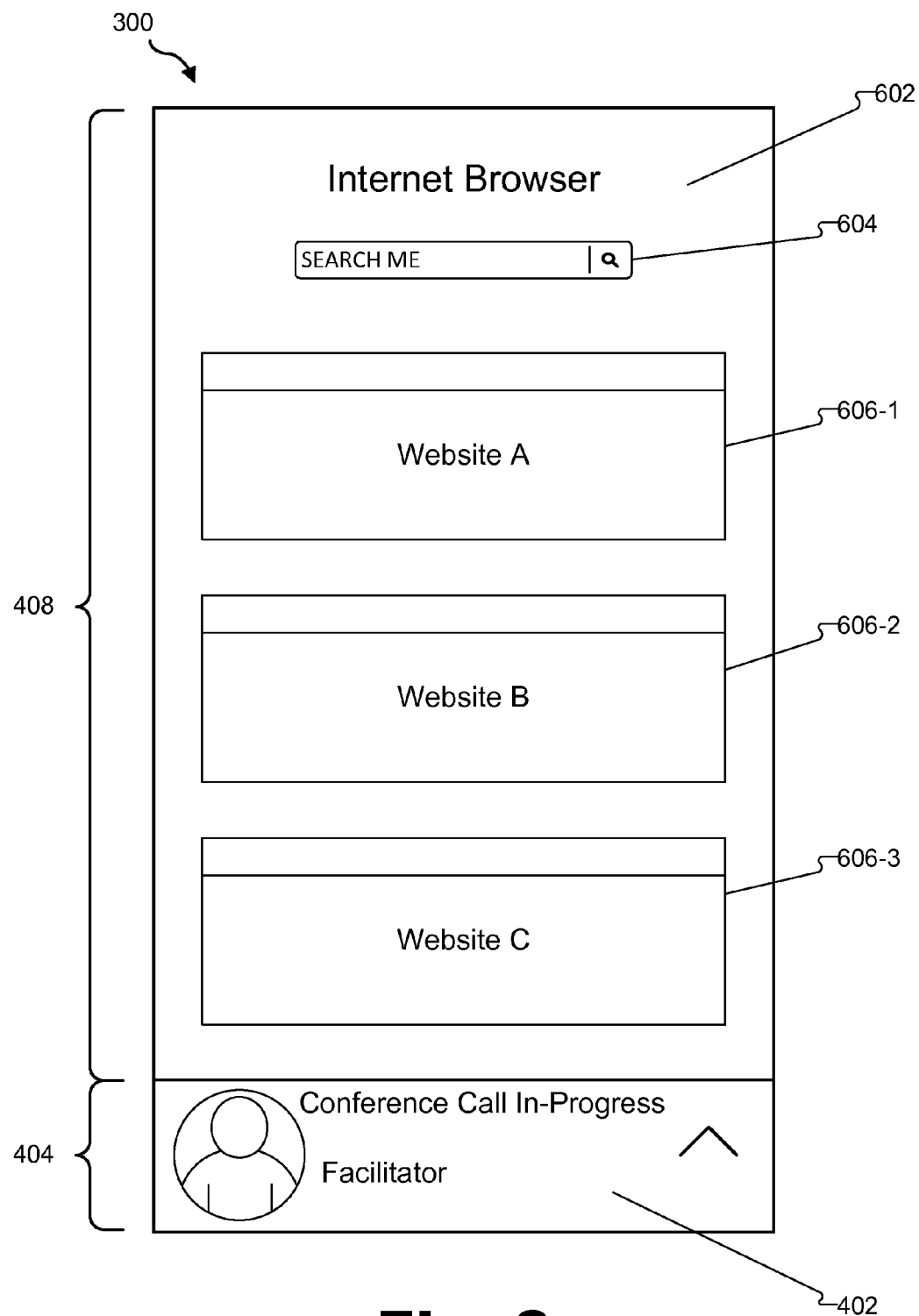

FIG. 6 shows application display area 300 after the mobile computing device has begun executing the Internet browsing mobile application. As shown, a user interface 602 associated with the Internet browsing mobile application is now displayed within second region 408 of application display area 300 in place of user interface 406. As is also shown, minimized widget 402 remains displayed within first region 404 of application display area 300. User interface 602 may facilitate interaction by the user with one or more features of the Internet browser mobile application. For example, user interface 602 may include an option 604 that allows the user to search the Internet and options 606 (e.g., options 606-1 through 606-3) that allow the user to access bookmarked websites.

While the minimized widget 402 and the user interface 602 are concurrently displayed within the application display area 300, a user may provide user input (e.g., a touch gesture or other suitable input as described herein) by way of the minimized widget 402 to control or otherwise interact with the conference call feature of the conference call mobile application. Likewise, the user may provide user input by way of user interface 602 to interact with one or more features of the Internet browser mobile application while minimized widget 402 remains displayed within the first region 404 of the application display area 300.

Figure 7:
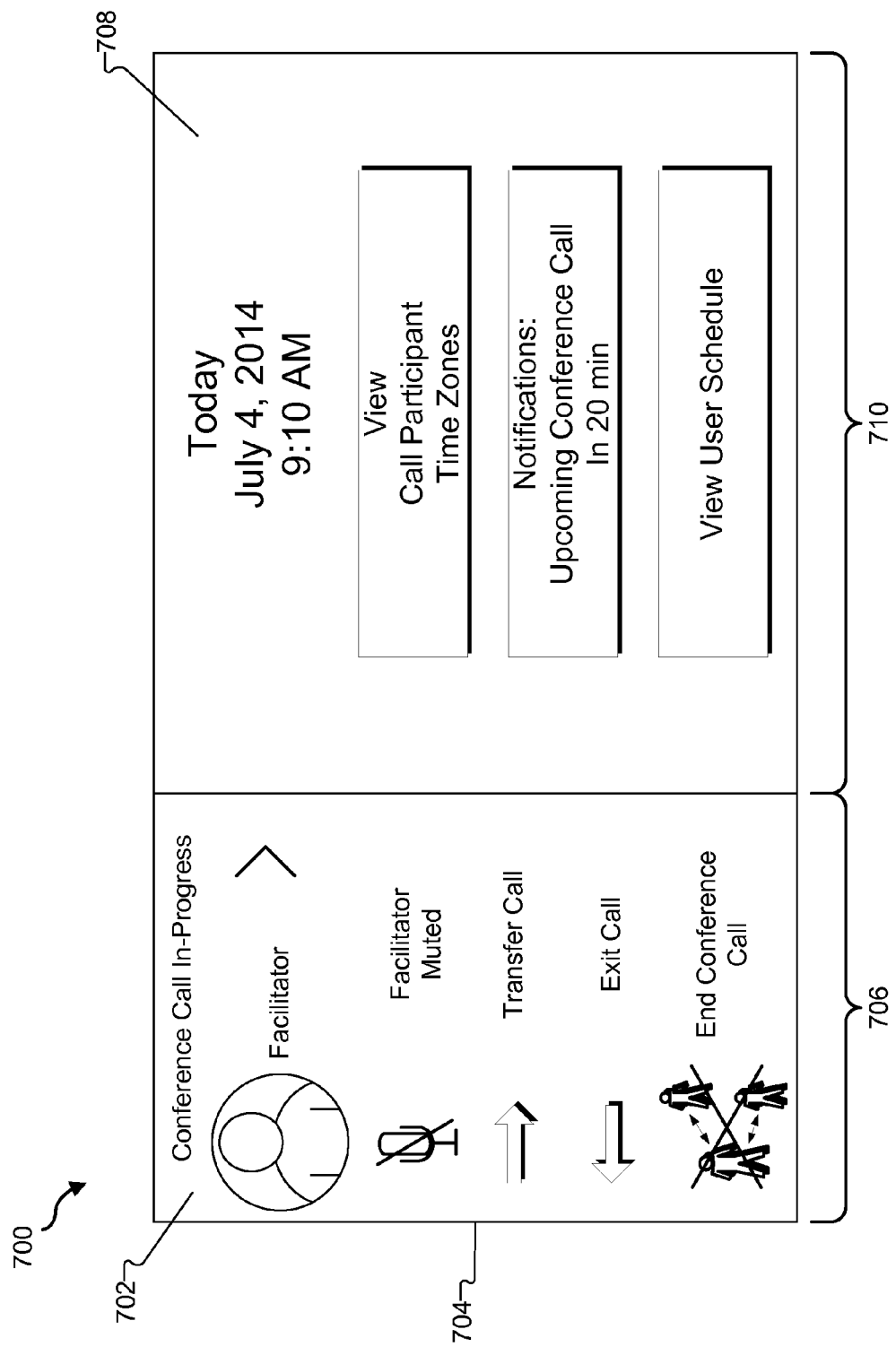

As mentioned previously, a minimized widget may not always be located along a bottom edge of an application display area displayed on a display screen of a mobile computing device (e.g., mobile computing device 100). For example, FIG. 7 shows an alternative configuration in which an exemplary application display area 700 includes a minimized widget 702 positioned along a side edge 704 of the application display area 700. As shown in FIG. 7, the minimized widget 702 may be displayed along one side of the application display area 700 (e.g., within a first region 706 disposed on the left side of application display area 700) while a user interface 708 may be displayed on the other side of the application display area 700 (e.g., within a second region 710 disposed on the right side of the application display area 700). In some examples, the minimized widget 702 may be displayed along the side edge 704 of the application display area 700 in response to a user physically rotating a mobile computing device displaying the application display area 700 from a portrait orientation to a landscape orientation. In other examples, the minimized widget 702 may be displayed along the side edge 704 of the application display area 700 in response to user input.

In the example of FIG. 7, the minimized widget 702 and the user interface 708 are both associated with the same mobile application (e.g., a conference call mobile application). Alternatively, the minimized widget 702 and the user interface 708 may be associated with different mobile applications.

In some examples, the size of the first region 706 of the application display area 700 in which the minimized widget 702 is presented may be larger when displayed in a landscape orientation than when displayed in a portrait orientation. As a result and as shown in FIG. 7, minimized widget 702 may include relatively more content (e.g., graphics and user-selectable options) than minimized widget 402.

Figure 8:
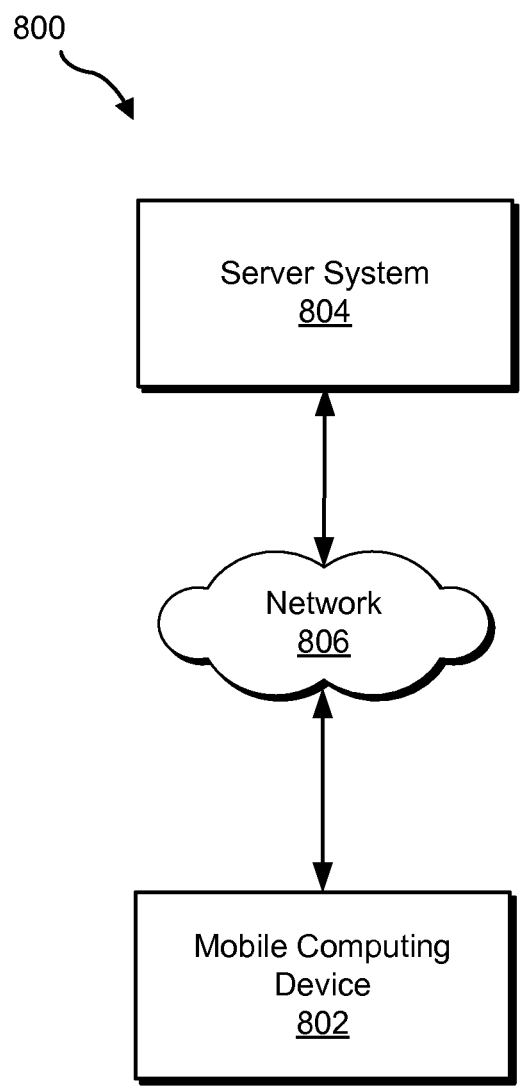
FIG. 8 illustrates an exemplary implementation of the system of FIG. 2 according to principles described herein.

FIG. 8 illustrates an exemplary implementation 800 of mobile application management system 200 wherein a mobile computing device 802 and a server system 804 are communicatively coupled by way of a network 806. Management facility 204 and storage facility 206 may each be implemented by server system 804 and/or mobile computing device 802. Accordingly, in certain embodiments, components of system 200 may be implemented entirely by mobile computing device 802. In other embodiments, components of system 200 may be distributed across server system 804 and/or mobile computing device 802.

Server system 804 may include one or more server-side computing devices. Server system 804 may be associated with (e.g., managed by) a provider of the network 806, a provider of a mobile application, and/or any other entity. Mobile computing device 802 may include any of the mobile computing devices described herein. In some examples, mobile computing device 802 includes at least one processor that executes one or more mobile applications and performs one or more of the mobile application management operations as described herein.

Server system 804 and mobile computing device 802 may communicate using any communication platforms and technologies suitable for transporting data and/or communication signals, including known communication technologies, devices, media, and protocols supportive of remote communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Global System for Mobile Communications ("GSM") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), Code Division Multiple Access ("CDMA") technologies, in-band and out-of-band signaling technologies, subscriber and/or proprietary television network communication technologies, and other suitable communications technologies.

Network 806 may include, but is not limited to, one or more wireless networks (Wi-Fi networks), wireless communication networks, mobile telephone networks (e.g., cellular telephone networks), mobile phone data networks, broadband networks, narrowband networks, the Internet, local area networks, wide area networks, live television transmission networks, and any other networks capable of carrying media content, data, and/or communications signals between server system 804 and mobile computing device 802. Communications between server system 804 and mobile computing device 802 may be transported using any one of the above-listed networks, or any combination or sub-combination of the above-listed networks. Alternatively, server system 804 and mobile computing device 802 may communicate in another way such as by one or more direct connections between server system 804 and mobile computing device 802.

Figure 9:
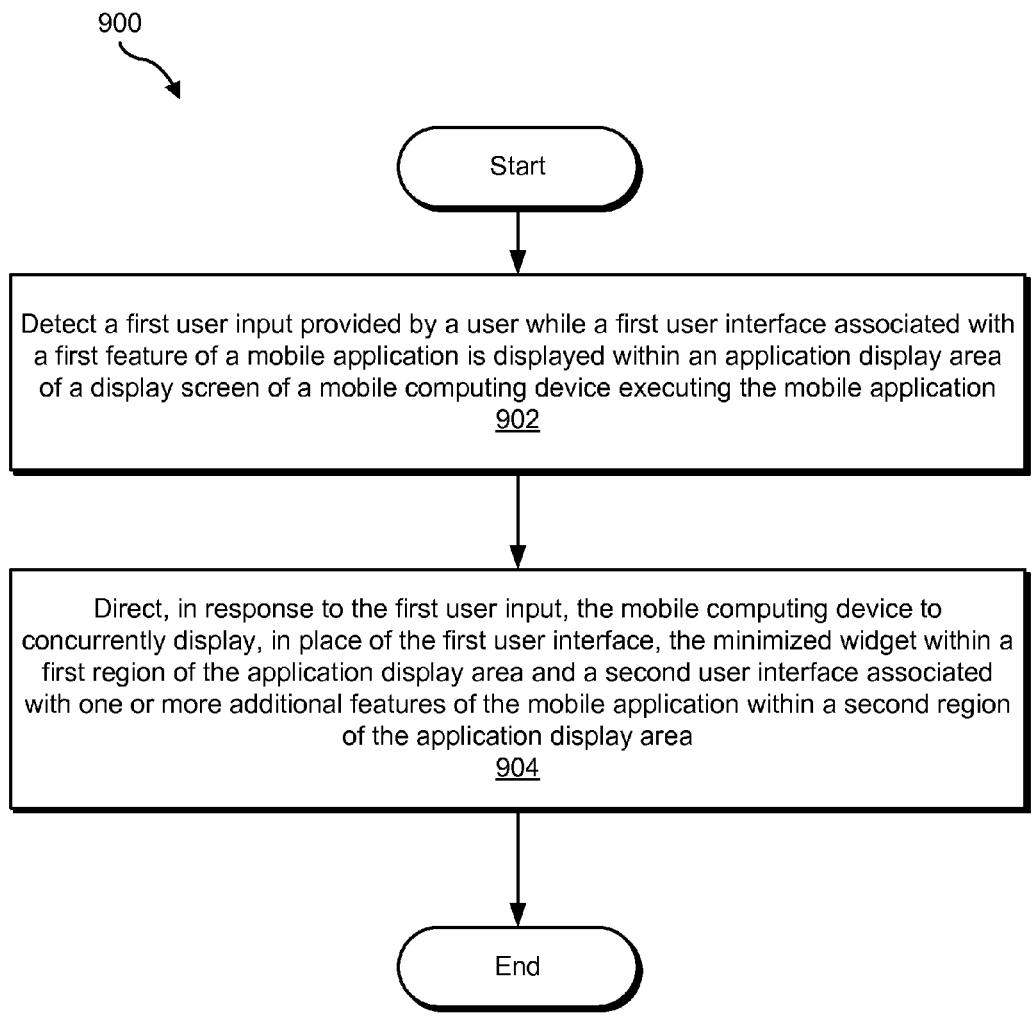
FIG. 9 illustrates an exemplary mobile application management method according to principles described herein.

FIG. 9 illustrates an exemplary mobile application management method according to principles described herein. While FIG. 9 illustrates an exemplary method according to certain embodiments, other embodiments may omit, add to, reorder, combine, and/or modify any of the steps shown in FIG. 9. In certain embodiments, one or more steps shown in FIG. 9 may be performed by system 200 and/or one or more components or implementations of system 200.

In step 902, a mobile application management system detects a first user input provided by a user while a first user interface associated with a first feature of a mobile application is displayed within an application display area of a display screen of a mobile computing device executing the mobile application. The first user input is representative of a request to transform the first user interface into a minimized widget associated with the first feature. Step 902 may be performed in any of the ways described herein.

In step 904, the mobile application management system directs, in response to the first user input, the mobile computing device to concurrently display, in place of the first user interface, the minimized widget within a first region of the application display area, and a second user interface associated with one or more additional features of the mobile application within a second region of the application display area. As described above, the second user interface facilitates interaction by the user with the one or more additional features of the mobile application within the second region of the application display area while the minimized widget is displayed within the first region of the application display area. Likewise, the minimized widget facilitates control by the user of the first feature of the mobile application while the second user interface is displayed within the second region of the application display area. Step 904 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 10:
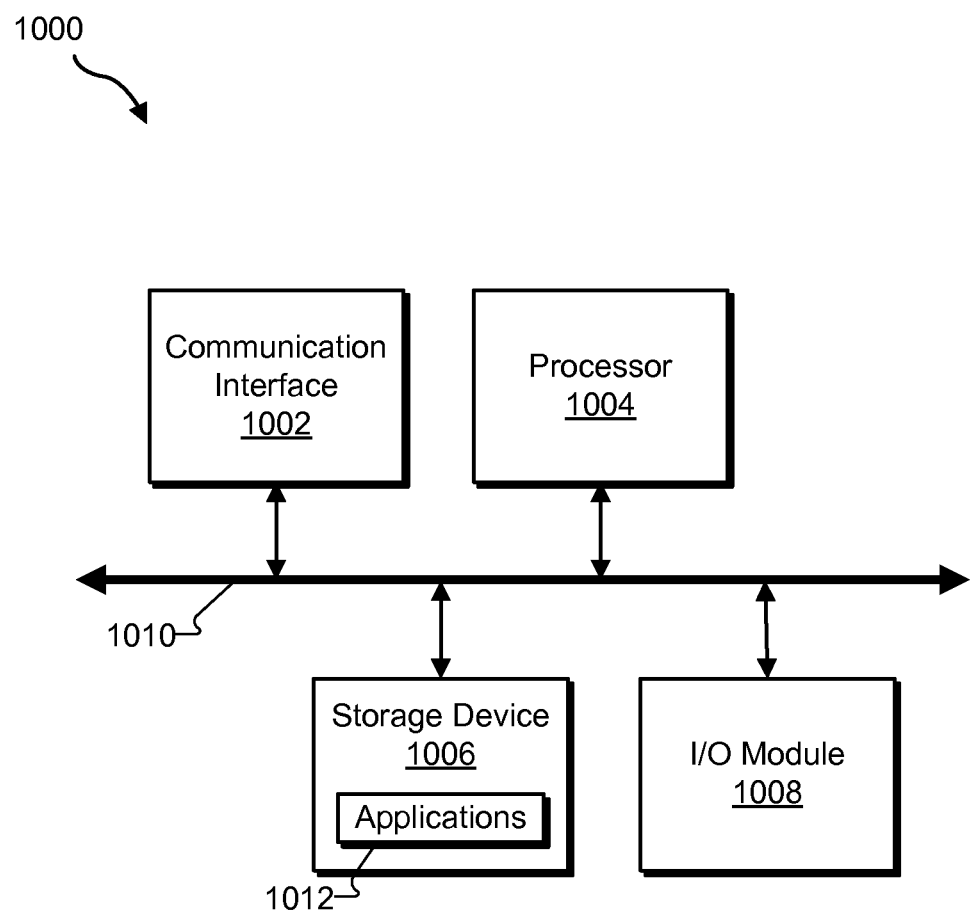
FIG. 10 illustrates an exemplary computing device according to principles described herein.

FIG. 10 illustrates an exemplary computing device 1000 that may be configured to perform one or more of the processes described herein. As shown in FIG. 10, computing device 1000 may include a communication interface 1002, a processor 1004, a storage device 1006, and an input/output ("I/O") module 1008 communicatively connected via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1006. For example, data representative of one or more executable applications 1012 configured to direct processor 1004 to perform any of the operations described herein may be stored within storage device 1006. In some examples, data may be arranged in one or more databases residing within storage device 1006.

I/O module 1008 may be configured to receive user input and provide user output and may include any hardware, firmware, software, or combination thereof supportive of input and output capabilities. For example, I/O module 1008 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1008 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1000. For example, one or more applications 1012 residing within storage device 1006 may be configured to direct processor 1004 to perform one or more processes or functions associated with detection facility 202 and management facility 204. Likewise, storage facility 206 may be implemented by or within storage device 1006.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by a mobile application management system, a first user input provided by a user while a first user interface associated with a first feature of a mobile application is displayed within an application display area of a display screen of a mobile computing device executing the mobile application, the first user input representative of a request to transform the first user interface into a minimized widget associated with the first feature; and
   directing, by the mobile application management system in response to the first user input, the mobile computing device to concurrently display, in place of the first user interface,
      the minimized widget within a first region of the application display area, and
      a second user interface associated with one or more additional features of the mobile application within a second region of the application display area;
   wherein
      the second user interface facilitates interaction by the user with the one or more additional features of the mobile application within the second region of the application display area while the minimized widget is displayed within the first region of the application display area, and
      the minimized widget facilitates control by the user of the first feature of the mobile application while the second user interface is displayed within the second region of the application display area.

2. The method of claim 1, further comprising:
   detecting, by the mobile application management system while the minimized widget is displayed within the first region of the application display area and while the second user interface is displayed within the second region of the application display area, a second user input provided by the user by way of the minimized widget, the second user input representative of a first command associated with the first feature of the mobile application; and
   directing, by the mobile application management system in response to the second user input, the mobile computing device to execute the first command associated with the first feature of the mobile application.

3. The method of claim 2, wherein the second user input comprises a touch gesture provided by the user within the first region of the application display area.

4. The method of claim 2, wherein, after receiving the second user input provided by the user by way of the minimized widget and while the mobile computing device executes the first command associated with the first feature of the mobile application, the minimized widget remains displayed within the first region of the application display area and the second user interface remains displayed within the second region of the application display area.

5. The method of claim 2, further comprising:
   detecting, by the mobile application management system while the minimized widget is displayed within the first region of the application display area and while the second user interface is displayed within the second region of the application display area, a third user input provided by the user by way of the second user interface, the third user input representative of a second command associated with a second feature included in the one or more additional features of the mobile application; and
   directing, by the mobile application management system in response to the third user input, the mobile computing device to execute the second command associated with the second feature.

6. The method of claim 5, wherein the third user input comprises a touch gesture provided by the user within the second region of the application display area.

7. The method of claim 5, wherein, after receiving the third user input provided by the user within the second region of the application display area and while the mobile computing device executes the second command associated with the second feature included in the one or more additional features of the mobile application, the minimized widget remains displayed within the first region of the application display area and the second user interface remains displayed within the second region of the application display area.

8. The method of claim 1, wherein the detecting of the first user input provided by the user occurs while the first user interface entirely occupies the application display area of the display screen of the mobile computing device.

9. The method of claim 1, wherein the first user input representative of the request to transform the first user interface into the minimized widget comprises a touch gesture provided by the user within the application display area of the display screen of the mobile computing device.

10. The method of claim 1, wherein:
    the first region occupies a space along an edge of the application display area, and
    the second region occupies a remaining space of the application display area not occupied by the first region.

11. The method of claim 1, wherein the mobile application executed by the mobile computing device comprises a conference call mobile application.

12. The method of claim 11, wherein the first feature of the mobile application represents an active conference call between the user and one or more conference call participants, and wherein the minimized widget facilitates control by the user of one or more in-call controls associated with the active conference call.

13. The method of claim 1, further comprising:
    detecting, by the mobile application management system while the minimized widget is displayed within the first region of the application display area and while the second user interface is displayed within the second region of the application display area, a second user input representative of a command to execute an additional mobile application on the computing device; and
directing, by the mobile application management system in response to the second user input, the mobile computing device to display, while the minimized widget remains displayed within the first region of the application display area, a third user interface associated with the additional mobile application within the second region of the application display area in place of the second user interface;
wherein
the third user interface facilitates interaction by the user with one or more features of the additional mobile application within the second region of the application display area while the minimized widget is displayed within the first region of the application display area, and
the minimized widget facilitates control by the user of the first feature of the mobile application while the third user interface is displayed within the second region of the application display area.

14. The method of claim 1, embodied as computer-executable instructions on at least one non-transitory computer-readable medium.

15. A system comprising:
at least one physical computing device that:
detects a first user input provided by a user while a first user interface associated with a first feature of a mobile application is displayed within an application display area of a display screen associated with the at least one physical computing device, the first user input representative of a request to transform the first user interface into a minimized widget associated with the first feature; and
directs, in response to the first user input, the display screen associated with the at least one physical computing device to concurrently display, in place of the first user interface,
the minimized widget within a first region of the application display area, and
a second user interface associated with one or more additional features of the mobile application within a second region of the application display area;
wherein
the second user interface facilitates interaction by the user with the one or more additional features of the mobile application within the second region of the application display area while the minimized widget is displayed within the first region of the application display area, and
the minimized widget facilitates control by the user of the first feature of the mobile application while the second user interface is displayed within the second region of the application display area.

16. The system of claim 15, wherein the at least one physical computing device:
detects, while the minimized widget is displayed within the first region of the application display area and while the second user interface is displayed within the second region of the application display area, a second user input representative of a command to access an additional mobile application; and
directs, in response to the second user input, the display screen associated with the at least one physical computing device to concurrently display, while the minimized widget remains displayed within the first region of the application display area, a third user interface associated with the additional mobile application within the second region of the application display area in place of the second user interface;
wherein
the third user interface facilitates interaction by the user with one or more features of the additional mobile application within the second region of the application display area while the minimized widget is displayed within the first region of the application display area, and
the minimized widget facilitates control by the user of the first feature of the mobile application while the third user interface is displayed within the second region of the application display area.

17. The system of claim 15, wherein the at least one physical computing device detects the first user input provided by the user while the first user interface entirely occupies the application display area of the display screen associated with the at least one physical computing device.

18. The system of claim 15, wherein the first user input representative of the request to transform the first user interface into the minimized widget comprises a touch gesture provided by the user within the application display area of the display screen associated with the at least one physical computing device.

19. A mobile computing device that comprises:
at least one processor that executes a mobile application; and
a display screen that displays at least one user interface associated with the mobile application;
wherein the at least one processor:
detects user input provided by a user interacting with the display screen, the user input representative of a request to transform a first user interface displayed within an application display area of the display screen and associated with a first feature of the mobile application into a minimized widget associated with the first feature of the mobile application; and
directs, in response to the user input, the display screen to display, in place of the first user interface,
the minimized widget within a first region of the application display area, and
a second user interface associated with one or more additional features of the mobile application within a second region of the application display area;
wherein
the second user interface facilitates interaction by the user with the one or more additional features of the mobile application within the second region of the application display area while the minimized widget is displayed within the first region of the application display area, and
the minimized widget facilitates control by the user of the first feature of the mobile application while the second user interface is displayed within the second region of the application display area.

20. The mobile computing device of claim 19, wherein the user input representative of the request to transform the first user interface into the minimized widget comprises a touch gesture provided by the user within the application display area of the display screen.

* * * * *